Patented May 24, 1949

2,470,855

UNITED STATES PATENT OFFICE 2,470,855

ROSIN MALEIC GLYCERINE ESTERS

William Krumbhaar, New York, N. Y.

No Drawing. Application September 4, 1946,
Serial No. 694,825

7 Claims. (Cl. 260—26)

This invention relates to resinous products of extremely high melting point and viscosity, more particularly to rosin maleic glycerine containing resins, to methods of producing such products, to methods of making components utilized in producing such products, and to utilizations of such products.

Rosin modified maleic glycerine esters, known in the trade as maleic resins, have great practical importance for the manufacture of surface coatings and printing inks. For this purpose the maleic resins must have high melting points and viscosity, combined with good solubility and fusibility. The prior art was able to combine these requirements only to a limited extent. If melting points and viscosities were increased by increasing the amounts of maleic compound in the resin, the solubility and fusibility was quickly lost. According to the methods of the prior art, it was not possible to increase the melting point of rosin modified maleic glycerine esters beyond 155° C. (determined by means of the A. S. T. M. method), without causing the resin to become insoluble and infusible. Neither was the prior art capable of increasing the viscosity of a rosin modified maleic glycerine ester beyond Z, determined as a 60% resin solution in xylol on the Gardner scale, without causing the resin to gelatinize in the production kettle.

Among the objects of this invention is to overcome the limitations of the prior art and to produce soluble and fusible resins with substantially higher characteristics, i. e., with melting points exceeding 180° C., and viscosities not less than $Z_3$.

Other objects include the production of modified resins including such soluble, fusible resins set forth above.

Still further objects and advantages of the present invention will appear from the more detailed description set forth below, it being understood that such more detailed description is given by way of illustration and explanation only, and not by way of limitation since various changes therein may be made by those skilled in the art without departing from the scope and spirit of the present invention.

In accordance with the present invention it has been found that monomolecular rosin maleic acid has unique properties in the resin production art and it has been found that the glycerine esters of the monomeric acid retain their solubility and fusibility in spite of extremely high melting points and viscosities.

The preparation of the monomolecular rosin maleic acid used in the production of the new ester type resins of the present invention is exemplified below.

As is well known, rosin and maleic anhydride or maleic acid react with each other forming a chemical compound, in which the basic ingredients are combined in the proportion of the molecular weights, i. e., 302 for abietic acid and 98 or 116 for maleic anhydride or acid respectively. The reaction starts at about 100° C. and can be carried through to completion at top temperatures of from 160 to 220° C. The resulting product, in short called rosin maleic acid, has an acid value of about 270, a melting point of about 140° C., and a molecular weight varying between 650 and 800, the molecular weight increasing with time and temperature of heating. The molecular weight indicates that the fused rosin maleic acid contains both the monomolecular form with a weight of 400, and the dimolecular substance with a molecular weight of 800, the dimerized portion being in the majority.

The rosin maleic reaction product is soluble in ethyl alcohol; however, the solutions are not stable and on standing form a white crystalline precipitate, which by combustion analysis and by determination of molecular weight, is identified as the monomeric form of the rosin maleic acid. The white crystals separate completely and can be obtained in pure form by filtration, washing with alcohol and drying at 110° C. for 24 hours. The last traces of alcohol adhere very firmly, however, but their removal is unnecessary for technical purposes.

To achieve the purposes of this invention, the crystalline monomeric acid must be produced with a reasonable speed, i. e., within one to two weeks, and with as high a yield as possible. The following rules have been found to govern the speed and quantity of crystallization obtained.

The speed of crystal formation increases with the resin concentration in the alcohol solution, i. e., a 50% solution may form crystals over night, whereas a 25% solution may require one to two weeks. The speed also is pronouncedly accelerated by the action of light, but is not influenced by low temperature, water content of the alcohol, additions of crystal nuclei or mineral acids like hydrochloric acid.

The quantity of the white precipitate, weighed after washing and drying, amounts to 35 to 40% of the total weight of rosin maleic compound, originally present in the solution. 30 to 33% precipitates quickly, while the balance crystallizes only slowly over a period of several weeks.

After this time the solution is free from crystallizable material. Investigation shows that the resin remaining in alcohol solution has an acid value of about 200 and a melting point of 140° C. The solution, therefore, is utilizable as a substitute for shellac solutions.

The yield of the crystalline rosin maleic acid declines when the temperature at which the two ingredients are reacted, is increased. Suitable reaction temperatures lay between 160° and 220° C., the best temperature range for practical purposes being 180 to 200° C. The yield from gum rosin is slightly higher than from wood rosin. Polymerized rosin is restricted in its reactivity with maleic anhydride or acid, and hydrogenated rosin does not react at all. Both rosin types, therefore, are unsuitable for preparing the rosin maleic acid.

Crystalline precipitates are also obtained from rosin maleic reaction mixtures, in which the rosin is in excess of the molecular equivalent, but the yield is considerably smaller than that obtained, from a product containing equimolecular amounts. Instead of maleic anhydride or maleic acid, malic acid can be used for the production of the monomeric rosin maleic acid. The yield, however, is so small that it makes malic acid uneconomical for this purpose.

The acid value of the crystalline acid can be determined by neutralization with $n/10$ alcoholic potassium hydroxide in toluol solution at room temperature, and is found to be 280. The crystals do not show any positive Liebermann-Storch reaction, indicating the absence of even traces of rosin.

The melting point of the material is found to be 225° C., i. e., extremely high and higher than the melting point of any other polybasic acid used in resin manufacture. The melting point is very sharp and fusion at the melting point occurs without decomposition. If heated more than 20° C. beyond the melting point, the monomeric compound starts to polymerize into the dimolecular product, as shown by the increase in molecular weight, which gradually goes up from 400 to 800. Dimerization is completed after several hours heating at 280° C.

The melting point of the polymerized rosin maleic acid is about 75° C. lower than that of the monomeric acid, therefore, polymerization must be carefully avoided when the acid is esterified by glycerine.

The esterification of the monomeric acid is carried out in any desired way, as by fusing the ingredients gently together at temperatures which may be a few degrees above 225° C., and then heating the mixture to the temperature of esterification. This should generally be below 280° C. Ester formation with glycerine occurs with slow speed at 240 to 250° and is more practically carried out at 260 to 270° C.

The glycerine esters of the monomeric rosin maleic acid have unique properties which are quite different from those of the polymerized acid. They are fusible without gelling, heat hardening, charring or decomposition; they possess extremely high melting points of 180 to 200° C. and higher, depending upon the degree of neutralization. An ester of an acid value of about 100 for instance, possesses a melting point of 195° C. The amount of glycerine may vary from 15 to 25% by weight of the monomeric rosin maleic acid. If lower amounts are used, the rosin maleic acid is not esterified quickly enough to avoid polymerization and decomposition; if higher amounts are employed, the ester product contains mono- and di-glycerides. Both conditions tend to lower the melting point.

Equivalent esters of the dimolecular rosin maleic acid cannot be produced because when esterification is attempted, the reaction mixture gelatinizes into an infusible and insoluble mass, as soon as a melting point of 155° C. is reached, using for instance, 20% glycerine and an esterification temperature of 260° C., the resin converts into a gel after 5 hours heating.

The reason for the vastly different behavior of the monomeric and the dimolecular ester is probably to be found in the great difference of their molecular size. A simple calculation shows that the ester of the monomeric acid should possess a molecular weight of about 1300, which is entirely in the field of soluble and fusible resins, whereas the dimeric acid should have a molecular weight of about 2500, i. e., a size which is far beyond the borderline of 2000, beyond which resins become insoluble and infusible.

The glycerine esters of the monomeric rosin maleic acid are soluble in coal tar solvents, giving solutions which are homogeneous in appearance and free from overpolymerized particles, a 60% xylol solution yielding a viscosity of about $Z_5$ to $Z_6$ on the Gardner scale.

The resins are also miscible and soluble in all rosin based resinous esters, this property enabling very useful application of the new esters in the improvement of such resins. The new high melting point and high viscosity resinous esters described in this invention, dissolve at temperatures for example, of 225 to 250° C. in other resins, in particular in rosin glycerine or pentaerythritol esters and in rosin modified maleics or phenolics, or combinations of such resins, improving their melting point and their viscosity. They also dissolve in fused natural copals, copal type synthetic resins and other copal based resinous esters, rendering them harder and more viscous.

The following examples illustrate the invention, parts being by weight unless otherwise indicated.

Examples 1 and 2 demonstrate the method of preparing the monomeric rosin maleic acid.

*Example 1.*—300 parts of gum rosin are fused together with 100 parts of maleic anhydride and reacted at 180° C. for 2 hours. After the foaming has subsided, the reaction mixture, weighing 380 parts, is poured out for cooling, broken up in small pieces and dissolved in an equal amount by weight of 95% ethyl alcohol. The solution is stored at room temperature, preferably with access of light, for one week. The white crystalline mass precipitated during this period is filtered off, washed once with alcohol and dried overnight at 110° C. The yield of monomeric rosin maleic acid obtained in this way, is 145 parts, i. e., 38% of the fused reaction product.

*Example 2.*—300 parts of wood rosin are heated with 120 parts of maleic acid slowly to 200° C. and held at this temperature for one hour, after which time the reaction is completed. The resulting resinous mass, after cooling and breaking up, is dissolved in 275 parts by weight of denatured alcohol and the solution is stored for 2 weeks at room temperature, with its surface exposed to the light. During this period the monomeric rosin maleic acid is precipitated in the form of white crystals, which settle and are easily filtered off. The washed and dried precipitate weighs 125 parts, meaning a yield of 33%.

Examples 3 and 4 illustrate esterification of the monomeric rosin maleic acid.

*Example 3.*—100 parts of the crystalline acid, obtained according to the procedure described in Example 1 are fused gently and mixed thoroughly with 18 parts of 95% C. P. glycerine at a temperature of 228°. The mixture is then heated to 265° and held at 265° for 4 hours with vacuum applied during the last hour. The resulting resinous ester has a melting point of 205° C. and a viscosity of $Z_6$ in 60% xylol solution on the Gardner scale.

*Example 4.*—100 parts of the white crystals of rosin maleic acid produced by the method described in Example 2 are carefully melted and mixed with 22 parts of glycerine. The temperature then is gradually raised to 260° C., held there for 6 hours, using vacuum during the last 2 hours. In this way a glycerine ester of the monomeric acid is obtained, which has a melting point of 195° C. and a viscosity of $Z_5$ in 60% xylol solution on the Gardner scale.

Examples 5 and 6 illustrate the production of combinations of the monomeric rosin maleic glyceride with rosin modified phenolic resins.

*Example 5.*—100 parts of a rosin modified bis phenol resin with a melting point of 155° C. and a viscosity of Z are heat combined with 50 parts of the monomeric ester resin, obtained by the procedure described in Example 3. The phenolic resin is produced by reacting 100 parts of gum rosin with 20 parts of an alkali catalyzed condensate of one mol bis phenol with 3 mols formaldehyde in the usual manner, and esterifying the rosin phenolic body with 10 parts of pentaerythritol.

In order to completely combine the monomeric maleic ester with the phenolic resin, it is necessary to heat to 250° C. The resulting product is an improved resin with a melting point of 170° C. and a viscosity of $Z_3$.

*Example 6.*—100 parts of a rosin modified alkyl phenol resin with a melting point of 145° C. and a viscosity of S are heat combined with 100 parts of the monomeric ester resin, obtained by the procedure described in Example 4. The phenolic resin is produced by reacting 100 parts of wood rosin with 30 parts of an alkali catalyzed condensate of one mol para tertiary butyl phenol with two mols formaldehyde in the usual manner, and esterifying the rosin phenolic body with 10 parts of glycerine.

In order to completely combine the monomeric maleic ester with the phenolic resin, it is necessary to heat to 240° C. The resulting product is an improved resin with a melting point of 170° C. and a viscosity of Z.

Having thus set forth my invention, I claim:

1. The method of producing a soluble and fusible rosin maleic glycerine ester soluble in coal tar solvents with a melting point higher than 180° C. and a viscosity higher than $Z_3$ by esterifying at temperatures above 225° C. but below 280° C. with 15 to 25% glycerine by weight the monomolecular crystalline rosin maleic acid, the monomer being the only rosin maleic acid present.

2. In the method of producing a soluble and fusible rosin maleic glycerine ester soluble in coal tar solvents with a melting point higher than 180° C. and a viscosity higher than $Z_3$ from the monomolecular crystalline rosin maleic acid obtained by precipitation from the ethyl alcohol solution of the reaction product made by fusing together at temperatures of 160 to 220° C., equimolecular weights of rosin with a maleic component selected from the group consisting of the anhydride and acid, the step of esterifying said monomolecular acid being the only rosin maleic acid present with from 15 to 25% of glycerine by weight at temperatures above 225° C. but below 280° C.

3. In the method of producing a soluble and fusible rosin maleic glycerine ester soluble in coal tar solvents with a melting point higher than 180° C. and a viscosity higher than $Z_3$, the steps of fusing substantially equimolecular weights of rosin and a maleic component selected from the group consisting of the anhydride and the acid at temperatures of from 160 to 220° C., dissolving the reaction product in ethyl alcohol, precipitating the monomolecular rosin maleic acid from said solution, separating the alcoholic solution containing dimolecular rosin maleic acid, and esterifying the monomolecular acid being the only rosin maleic acid present with from 15 to 25% by weight of glycerine at temperatures of from above 225° to below 280° C.

4. A fusible rosin maleic glycerine ester with a melting point higher than 180° C. and a viscosity higher than $Z_3$, soluble in coal tar solvents, the rosin maleic acid contained in the ester being monomolecular and the content of glycerine varying between 15 and 25% by weight of the monomeric acid.

5. A fusible rosin maleic glycerine ester with a melting point of approximately 195° C. and a viscosity of $Z_5$ in 60% xylol solution on the Gardner scale, the ester being soluble in coal tar solvents, the rosin maleic acid contained in the ester being monomolecular and the content of glycerine varying between 15 and 25% by weight of the monomeric acid.

6. A fusible rosin maleic glycerine ester with a melting point of 205° C. and a viscosity of $Z_6$, soluble in coal tar solvents, the rosin maleic acid contained in the ester being monomolecular and the content of glycerine varying between 15 and 25% by weight of the monomeric acid.

7. The method as set forth in claim 1, in which the monomeric acid is fused gently with the glycerine at temperatures a few degrees above the melting point of the acid at the beginning of the process.

WILLIAM KRUMBHAAR.

REFERENCES CITED

The following references are of record in the file of this patent:

UNITED STATES PATENTS

| Number | Name | Date |
|---|---|---|
| 2,033,133 | Ellis | Mar. 10, 1936 |
| 2,039,243 | Krzikalla et al. | Apr. 28, 1936 |
| 2,233,406 | Fielder | Mar. 4, 1941 |
| 2,322,197 | Oswald | June 15, 1943 |
| 2,359,980 | Fleck | Oct. 10, 1944 |